(12) United States Patent
Raghavan et al.

(10) Patent No.: US 11,026,235 B2
(45) Date of Patent: Jun. 1, 2021

(54) BEAM GROUPING FOR INTER-BAND CARRIER AGGREGATION

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Ashwin Sampath, Skillman, NJ (US); Junyi Li, Chester, NJ (US); Joseph Patrick Burke, San Diego, CA (US); Ozge Koymen, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/868,929

(22) Filed: May 7, 2020

(65) Prior Publication Data
US 2020/0367230 A1    Nov. 19, 2020

Related U.S. Application Data

(60) Provisional application No. 62/848,696, filed on May 16, 2019.

(51) Int. Cl.
| | | |
|---|---|---|
| *H04B 7/02* | (2018.01) | |
| *H04W 72/04* | (2009.01) | |
| *H04B 7/024* | (2017.01) | |
| *H04L 5/00* | (2006.01) | |

(52) U.S. Cl.
CPC .......... *H04W 72/048* (2013.01); *H04B 7/024* (2013.01); *H04L 5/001* (2013.01); *H04L 5/0035* (2013.01); *H04W 72/042* (2013.01); *H04W 72/044* (2013.01)

(58) Field of Classification Search
CPC ............. H04W 72/048; H04W 72/044; H04W 72/042; H04L 5/001; H04L 5/0035; H04B 7/024
USPC ......................................................... 375/267
See application file for complete search history.

(56) References Cited

U.S. PATENT DOCUMENTS

| | | | |
|---|---|---|---|
| 2013/0223251 A1 | 8/2013 | Li et al. | |
| 2017/0366994 A1* | 12/2017 | Akkarakaran | ....... H04B 7/0617 |
| 2019/0081675 A1* | 3/2019 | Jung | ....................... H04B 7/063 |
| 2019/0089447 A1* | 3/2019 | Sang | ..................... H04W 40/16 |
| 2019/0132066 A1* | 5/2019 | Park | .................. H04W 36/0079 |

(Continued)

FOREIGN PATENT DOCUMENTS

WO    WO-2019023643 A1    1/2019

OTHER PUBLICATIONS

International Search Report and Written Opinion—PCT/US2020/032596—ISAEPO—dated Jul. 27, 2020.

*Primary Examiner* — Don N Vo

(57) ABSTRACT

In an aspect of the disclosure, methods, a computer-readable media, and apparatus are provided. An method for wireless communication includes identifying a first set of one or more beams for communication with a first cell on a first carrier. The method includes identifying a second set of one or more beams for communication with a second cell on a second carrier. The method further includes transmitting an indication of a group of beams to the first cell or the second cell. The indication of the group of beams indicates allowed or disallowed combinations of beams for concurrent transmission or reception at the UE on the first and second carriers.

30 Claims, 10 Drawing Sheets

(56) References Cited

U.S. PATENT DOCUMENTS

| | | | |
|---|---|---|---|
| 2019/0253220 A1* | 8/2019 | Kim | H04L 5/0053 |
| 2020/0120584 A1* | 4/2020 | Yi | H04W 74/0866 |
| 2020/0205095 A1* | 6/2020 | Strom | H04J 11/0076 |
| 2020/0229104 A1* | 7/2020 | Molavianjazi | H04W 52/146 |
| 2020/0245228 A1* | 7/2020 | Rune | H04B 7/0871 |
| 2020/0358582 A1* | 11/2020 | Takeda | H04W 16/28 |

* cited by examiner

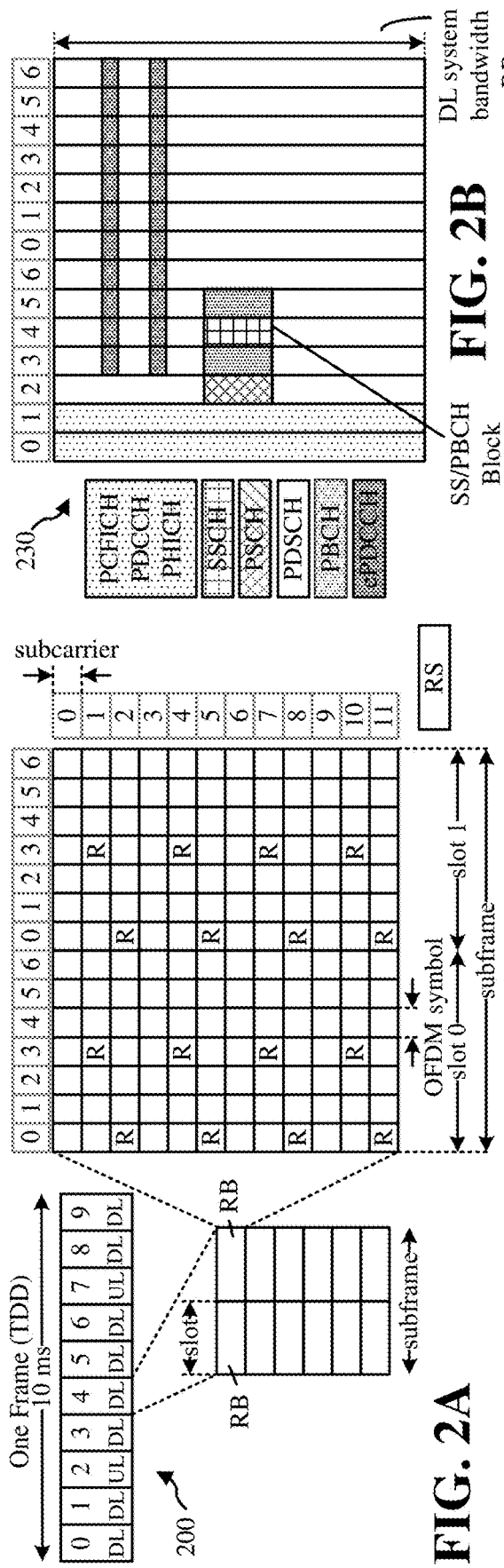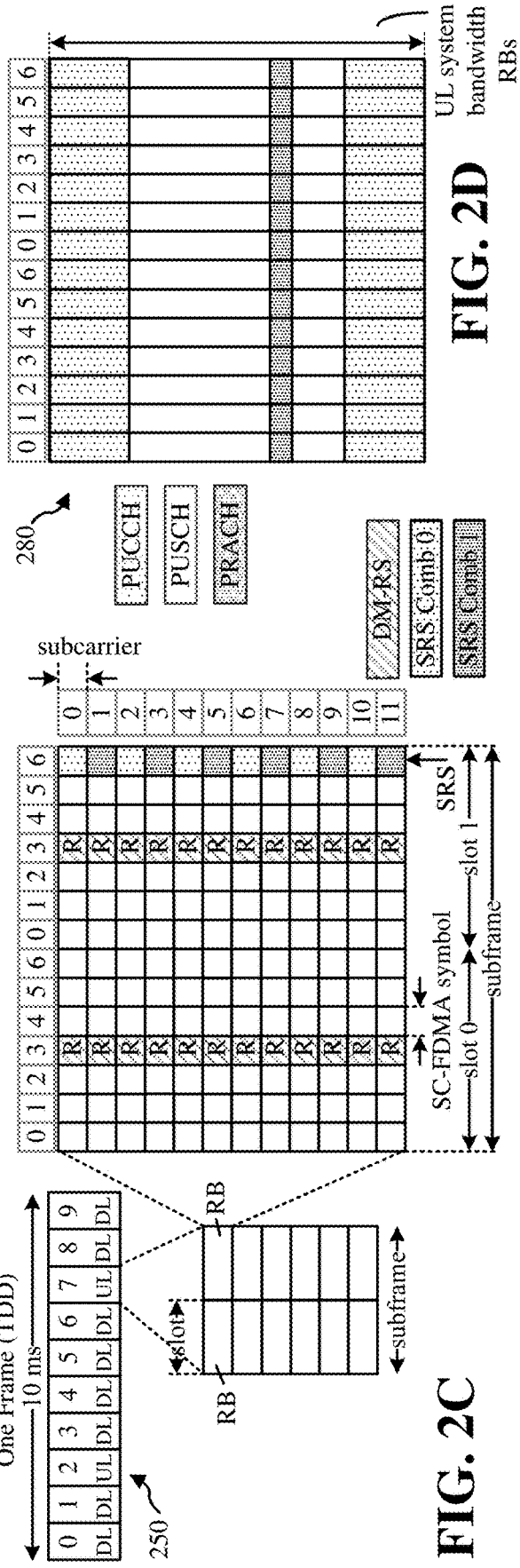

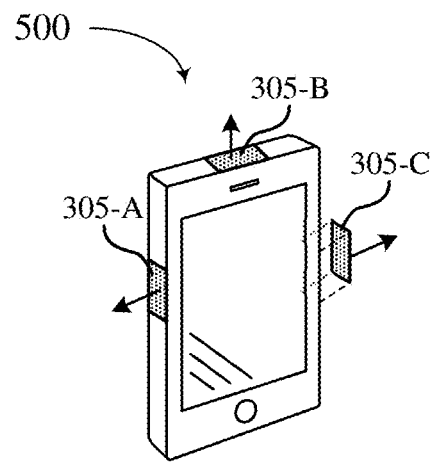
FIG. 5
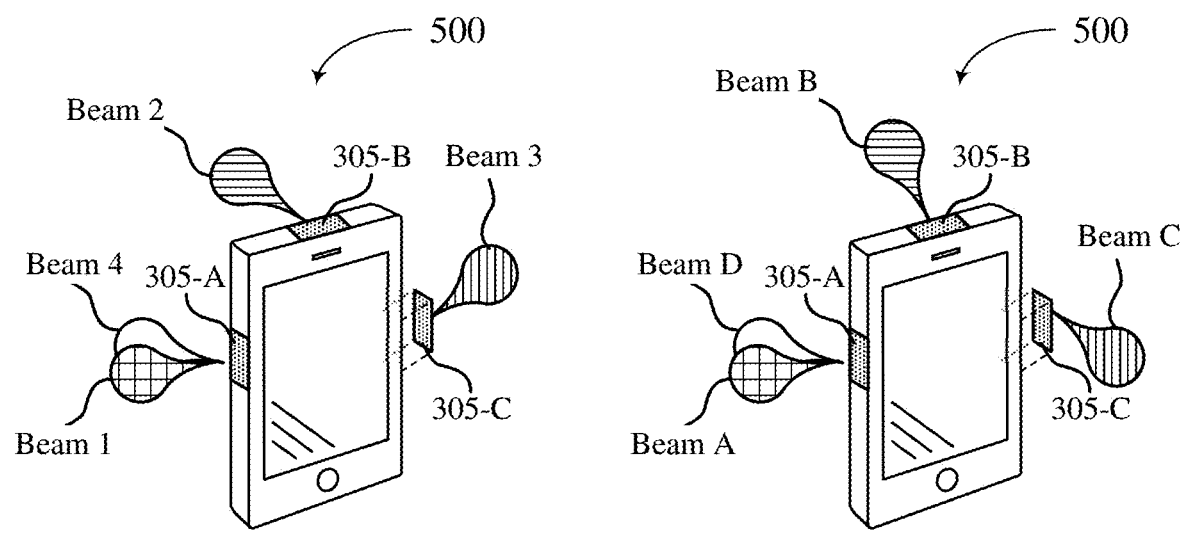
FIG. 6A  FIG. 6B

BEAM GROUPING FOR INTER-BAND CARRIER AGGREGATION

CROSS-REFERENCE TO RELATED APPLICATION

This patent application claims priority to U.S. Provisional Patent Application No. 62/848,696, filed on May 16, 2019, entitled "BEAM GROUPING FOR INTER-BAND CARRIER AGGREGATION." The disclosure of the prior application is considered part of and is incorporated by reference into this patent application.

BACKGROUND

Technical Field

The present disclosure relates generally to communication systems, and more particularly, to methods and systems for beam grouping for inter-band carrier aggregation such as at millimeter wave carrier frequencies.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. 5G NR technology is expected to utilize carrier aggregation, which allows a wireless device to utilize multiple carrier bands for communication. Support of both inter-band and intra-band carrier aggregation may need to be supported.

SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In one embodiment, a user equipment (UE) may perform a method of wireless communication with another wireless device, such as a base station. The UE identifies a first set of one or more beams for communication with a first cell on a first carrier and identifies a second set of one or more beams for communication with a second cell on a second carrier. The UE transmits an indication of a group of beams to the first cell or the second cell that indicates allowed or disallowed combinations of beams for concurrent transmission or reception at the UE on the first and second carriers. The UE communicates with the other wireless device based on the indication of the group of beams.

A base station or other wireless communication device identifies a first set of one or more beams for communication with a UE on a first carrier. The base station or other wireless device receives an indication of a group of beams corresponding to allowed or disallowed combinations of beams for concurrent transmission or reception at the UE. The group of beams includes at least one beam from the first set and at least one beam from a second set of one or more beams for communication between the UE and a second cell on a second carrier. The base station or other wireless communication device communicates with the other wireless device based on the indication of the group of beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

FIG. 5 is a graphical diagram illustrating a UE supporting beam grouping in accordance with certain aspects of the disclosure.

FIGS. 6A and 6B are graphical diagrams illustrating a candidate beams and UE supporting beam grouping in accordance with certain aspects of the disclosure.

DETAILED DESCRIPTION

Figure 1:
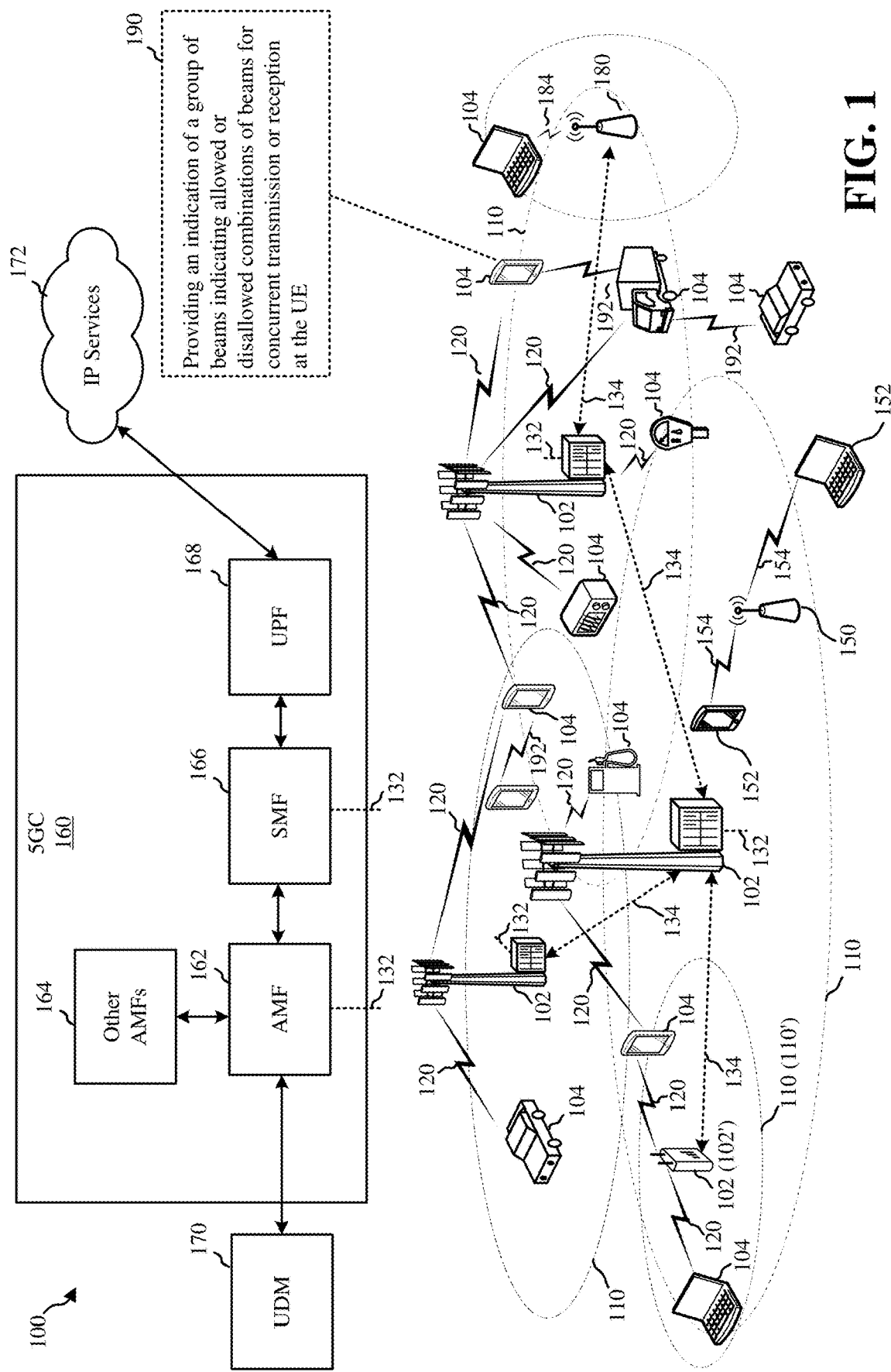
FIG. 1 is a diagram illustrating an example of a wireless communications system and an access network.

Current and future releases of 5G NR technologies make use of millimeter wave (mmW) frequencies for communications. At the UE side, implementations may utilize different numbers of RF chains across a single carrier or multiple carriers. For example, initial or low cost UE implementations may use two radio frequency (RF) chains, but on a single carrier at a time (e.g., in a 28 GHz band or a 39 GHz band). However, the number of supported RF chains is likely to increase over time and/or with UE implementations that use four, eight, or more RF chains. These different RF chains may be used for communication using different beams, carriers, and/or antenna modules.

Furthermore, these RF chains may be capable of utilizing different carriers concurrently (e.g., 24 GHz, 26 GHz, 28 GHz, 39 GHz, 73 GHz, etc.). Both intra-band and inter-band carrier aggregation in mmW frequencies are expected to be supported. See the 3GPP RAN4 agreement R4-1902678 indicating different operating bands and band classes in which bands n257, n258, and n261 may be considered to be 24/28 GHz bands while band n260 may be considered to be a 39 GHz band. Intra-band carrier aggregation may be supported within a certain band class (aggregation of carriers that are within a single band class such as one of n257, n258, n260, or n261). Inter-band carrier aggregation may be supported across multiple band classes (aggregation of carriers that are in different band classes).

In addition to having different capabilities or limitations in relation to the number of total RF chains supported, some UE embodiments may have limitations on the number of RF chains per antenna module or whether carriers can be aggregated on the same antenna module. In some cases, these limitations may be dynamic and may be selected on a per-symbol or per-slot basis. In order to communicate these limitations, a UE may provide an indication to a base station or other device it is communicating with. According to one embodiment, the UE may identify a first set of one or more beams for communication with a first cell on a first carrier and identify a second set of one or more beams for communication with a second cell on a second carrier. The UE may identify the first set and second set by performing beam training with a respective cell or transmit-receive point (TRP) of a cell. The UE may transmit an indication of a group of beams to the first cell or the second cell, the indication of the group of beams indicating allowed or disallowed combinations of beams for concurrent transmission or reception at the UE on the first and second carriers. Based on the indication of the group of beams, the UE or one or more other devices may schedule communications and perform communications that comply with the indication.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a 5G Core (5GC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN), Next Generation RAN (NG-RAN)) interface with the 5GC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the 5GC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102 may have a coverage area 110 that overlaps the coverage area 110 of one or more macro base stations 102. A network that includes both small cell and macro cells may be known as a heterogeneous network. A heterogeneous network may also include Home Evolved Node Bs (eNB s) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102 may operate in a licensed and/or an unlicensed frequency spectrum. When operating in an unlicensed frequency spectrum, the small cell 102 may employ NR and use the same 5 GHz unlicensed frequency spectrum as used by the Wi-Fi AP 150. The small cell 102, employing NR in an unlicensed frequency spectrum, may boost coverage to and/or increase capacity of the access network.

The gNodeB (gNB) 180 may operate in mmW and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW RF band has extremely high path loss and a short range. The mmW base station 180 may utilize beamforming 184 with the UE 104 to compensate for the extremely high path loss and short range.

The 5GC 160 may include an Access and Mobility Management Function (AMF) 162, other AMFs 164, a Session Management Function (SMF) 166, and a User Plane Function (UDP) 168. The AMF 162 may be in communication with a Unified Data Management (UDM) 170. The AMF 162 is the control node that processes the signaling between the UEs 104 and the 5GC 160. Generally, the AMF 162 provides QoS flow and session management. All user Internet protocol (IP) packets are transferred through the UPF 168. The UPF 168 provides UE IP address allocation as well as other functions. The UPF 168 is connected to the IP Services 172. The IP Services 172 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the 5GC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, a vehicle UE (VUE) or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In certain aspects, a UE 104 may provide 190 an indication of a group of beams. The indication of the group of beams may indicate an allowed or disallowed combination of beams for concurrent transmission or reception at the UE. Based on the indication a base station 102 or one or more other wireless communication device may avoid communicating using beams or combinations of beams to communicate that do not comply with the indication provided 190 by the UE 104. The UE 104 may determine one or more groups of beams that comply with a limitation at the UE 104. For example, the groups of beams may indicate groups of beams that are allowed or disallowed based on a limit on how many RF chains are available at the UE 104, how many RF chains are allowed per antenna module, and/or whether aggregation of carriers in different bands is allowed on the same antenna module.

In one embodiment, the UE 104 identifies a first set of one or more beams for communication with a first cell on a first carrier and identifies a second set of one or more beams for communication with a second cell on a second carrier. The UE 104 may provide 190 (such as by transmitting) an indication of a group of beams to the first cell or the second cell, the indication of the group of beams indicating allowed or disallowed combinations of beams for concurrent transmission or reception at the UE on the first and second carriers. The indication of the group of beams may indicate a plurality of different groups of beams which are allowed or disallowed. The UE 104 may provide 190 the indication to one or more of the first cell and the second cell. The first carrier and second carrier may be served using spatially co-located or spatially distributed or non-co-located antenna modules. The first cell and the second cell (e.g., of one or more base stations 102) may coordinate to schedule communications with the UE 104 that comply with the indication of the group of beams.

FIG. 2A is a diagram 200 illustrating an example of a DL subframe within a 5G/NR frame structure. FIG. 2B is a diagram 230 illustrating an example of channels within a DL subframe. FIG. 2C is a diagram 250 illustrating an example of an UL subframe within a 5G/NR frame structure. FIG. 2D is a diagram 280 illustrating an example of channels within an UL subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

Other wireless communication technologies may have a different frame structure and/or different channels. A frame (10 ms) may be divided into 10 equally sized subframes (1 ms). Each subframe may include one or more time slots. Each slot may include 7 or 14 symbols, depending on the slot configuration. For slot configuration 0, each slot may include 14 symbols, and for slot configuration 1, each slot may include 7 symbols. The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. The subcarrier spacing and symbol length/duration are a function of the numerology. The subcarrier spacing may be equal to $2^{\mu}*15$ kKz, where $\mu$ is the numerology 0-5. The symbol length/duration is inversely related to the subcarrier spacing. FIGS. 2A, 2C provide an example of slot configuration 1 with 7 symbols per slot and numerology 0 with 2 slots per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE (indicated as R). The RS may include demodulation RS (DM-RS) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS)/PBCH block. The MIB provides a number of RB s in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. In one aspect, in CoMP, the SRS may be used by a base station for channel quality estimates which may be used for cluster management and scheduling (e.g., identifying TRPs that may cooperate to transmit to a UE).

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data and may additionally be used to carry a buffer status report (BSR), a power headroom report (PHR), and/or UCI.

Although some of the above discussion of frame structure may relate to communications between a UE and a base station, similar principles or frame structures, with variations, may be applied to communication between peer UEs.

Figure 3:
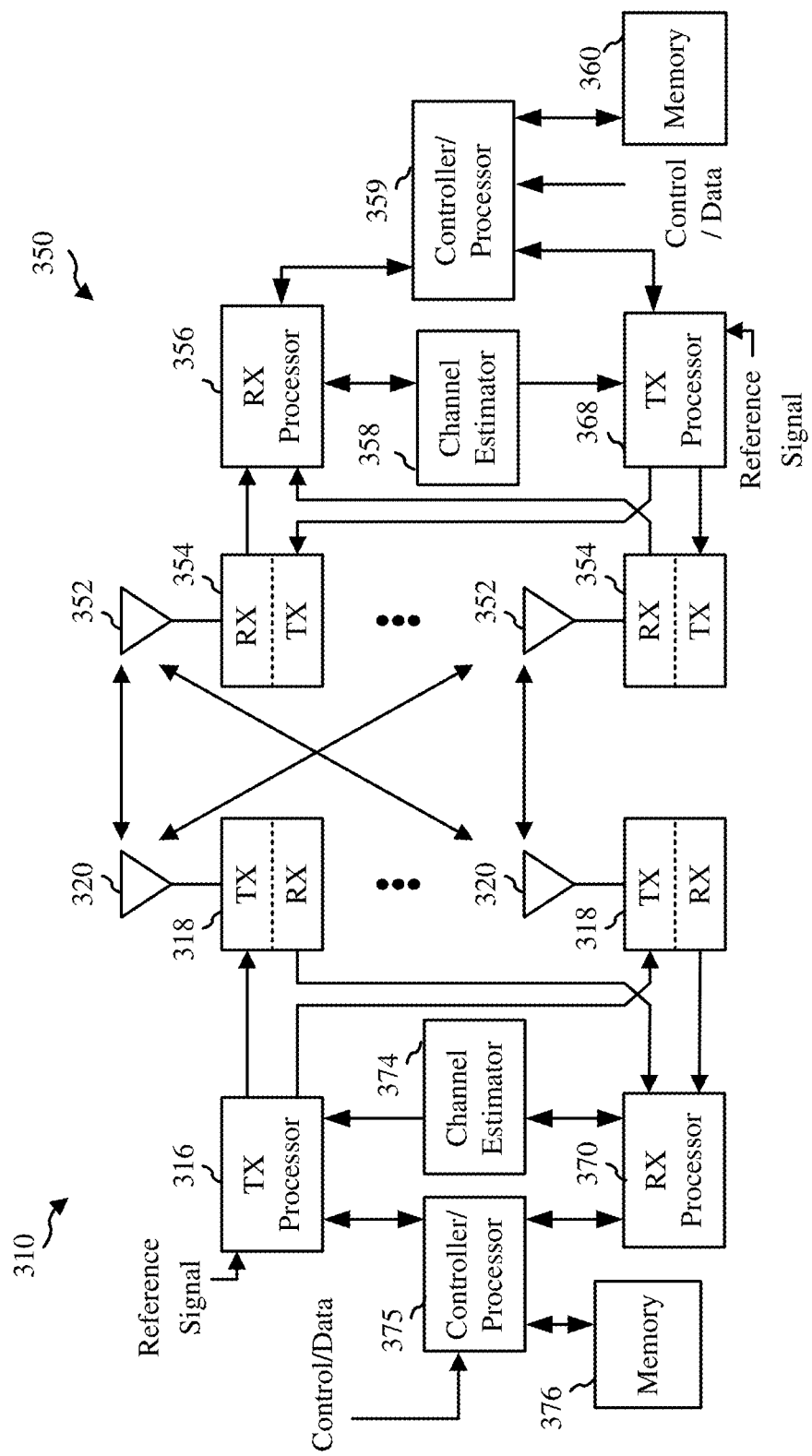
FIG. 3 is a diagram illustrating an example of a base station and UE in an access network.

FIG. 3 is a block diagram of a base station 310 in communication with a UE 350 in an access network. In the DL, IP packets from the 5GC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TB s), demultiplexing of MAC SDUs from TB s, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the 5GC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the 5GC 160. The controller/processor 375 is also responsible for error detection using an ACK and/or NACK protocol to support HARQ operations.

As discussed previously, performance of wireless communication services depends on a quality of a wireless channel between a transmitter and a receiver. Some wavelengths, such as mmW bands, rely on directional beamforming to overcome high path loss. Often, communications in mmW NR systems are performed using a directional beam pair (a TX beam at a transmitter and an RX beam at a receiver). Due to mobility or dynamic blockages, a channel quality for the beam pair may vary over time. One way to maintain link quality is through beam management during which a base station 102, or other device, sends reference signals to a UE 104. The reference signals allow the UE 104 to monitor link quality by measuring or determining channel metrics such as a reference signal received power (RSRP), a signal-to-noise ratio (SNR), a CQI, or another channel metric. The UE 104 may feedback the results and the base station 102 or other device may make decisions about how to communicate with the UE 104. For example, a base station 102 may send an instruction to switch a beam, hand the UE 104 over to a different node or cell, or the like.

Figure 4:
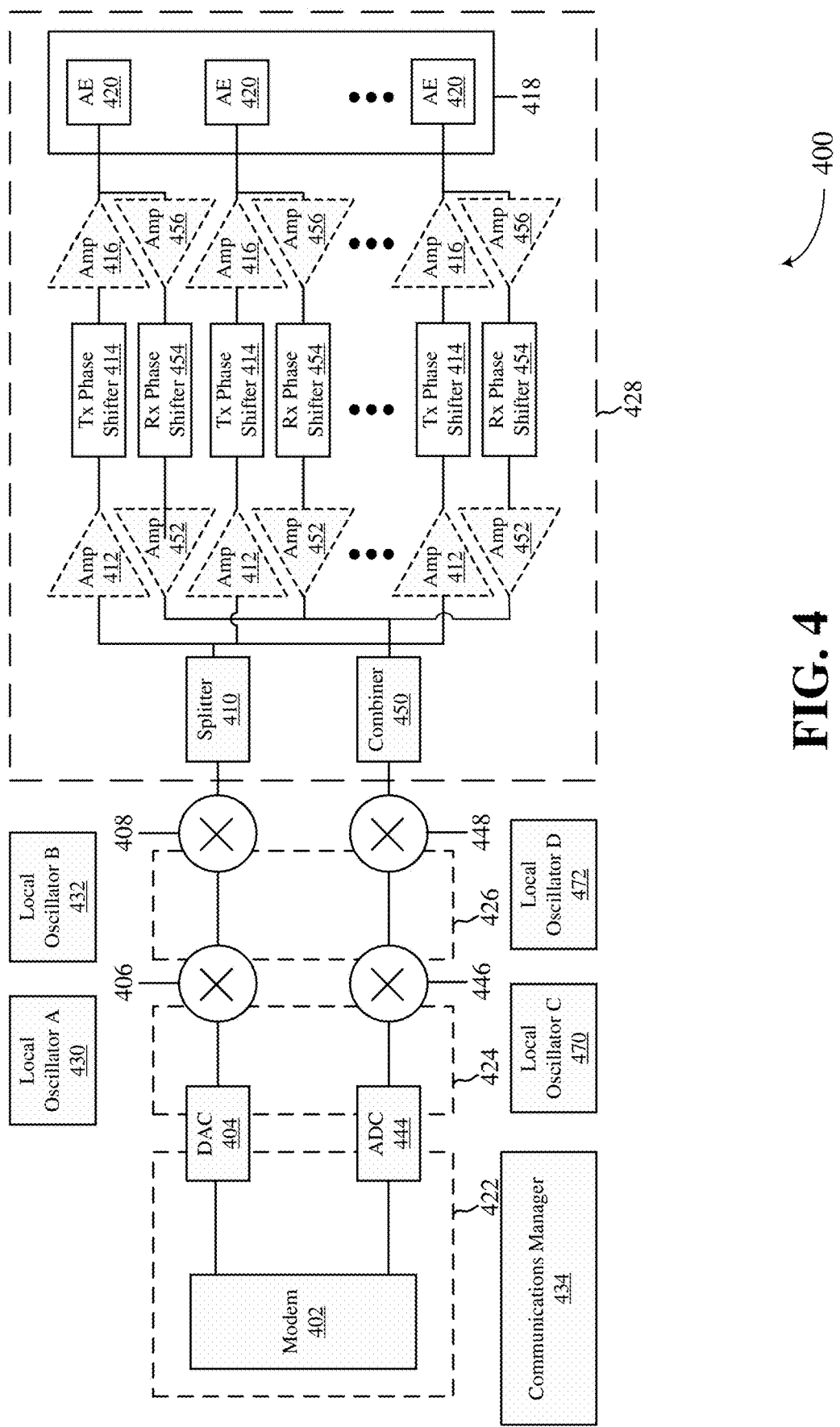
FIG. 4 is a graphical diagram illustrating an architecture supporting beamforming and beam grouping for inter-band carriers aggregation in a mmW channel in accordance with certain aspects of the disclosure.

FIG. 4 illustrates an example of an architecture 400 that supports beam grouping for inter-band carrier aggregation in a mmW channel in accordance with aspects of the present disclosure. In some examples, architecture 400 may implement aspects of a wireless communication system or a wireless communication device such as those discussed in relation to FIG. 1, 2, or 3. In some aspects, diagram 400 may be an example of the transmitting device (e.g., a first wireless device, UE, or base station) and/or a receiving device (e.g., a second wireless device, UE, or base station) as described herein.

Broadly, FIG. 4 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture 400 includes a modem (modulator/demodulator) 402, a digital to analog converter (DAC) 404, a first mixer 406, a second mixer 408, and a splitter 410. The architecture 400 also includes a plurality of first amplifiers 412, a plurality of phase shifters 414, a plurality of second amplifiers 416, and an antenna array 418 that includes a plurality of antenna elements 420. Transmission lines or other waveguides, wires, traces, or the like are shown connecting the various components to illustrate how signals to be transmitted may travel between components. Boxes 422, 424, 426, and 428 indicate regions in the architecture 400 in which different types of signals travel or are processed. Specifically, box 422 indicates a region in which digital baseband signals travel or are processed, box 424 indicates a region in which analog baseband signals travel or are processed, box 426 indicates a region in which analog intermediate frequency (IF) signals travel or are processed, and box 428 indicates a region in which analog radio frequency (RF) signals travel or are processed. The architecture also includes a local oscillator A 430, a local oscillator B 432, and a communications manager 434.

Each of the antenna elements 420 may include one or more sub-elements (not shown) for radiating or receiving RF signals. For example, a single antenna element 420 may include a first sub-element cross-polarized with a second sub-element that can be used to independently transmit cross-polarized signals. The antenna elements 420 may include patch antennas or other types of antennas arranged in a linear, two dimensional, or other pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases some processing or filtering (not shown) may take place at the IF. The second mixer 408 upconverts the analog IF signals to analog RF signals using the local oscillator B 432. Similarly to the first mixer, the second mixer 408 may mix the signals with an oscillating signal generated by the local oscillator B 432 to "move" the IF analog signals to the RF, or the frequency at which signals will be transmitted or received. The modem 402 and/or the communications manager 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into a plurality of identical or nearly identical RF signals, as denoted by its presence in box 428. In other examples, the split may take place with any type of signal including with baseband digital, baseband analog, or IF analog signals. Each of these signals may correspond to an antenna element 420 and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some implementations. In one implementation, both the first amplifier 412 and second amplifier 414 are present. In another, neither the first amplifier 412 nor the second amplifier 414 is present. In other implementations, one of the two amplifiers 412, 414 is present but not the other. By way of example, if the splitter 410 is an active splitter, the first amplifier 412 may not be used. By way of further example, if the phase shifter 414 is an active phase shifter that can provide a gain, the second amplifier 416 might not be used. The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or communications manager 434) to provide independent control of the gain for each antenna element 420. For example, the modem 402 and/or the communications manager 434 may have at least one control line connected to each of the splitter 410, first amplifiers 412, phase shifters 414, and/or second amplifiers 416 which may be used to configure a gain to provide a desired amount of gain for each component and thus each antenna element 420.

The phase shifter 414 may provide a configurable phase shift or phase offset to a corresponding RF signal to be transmitted. The phase shifter 414 could be a passive phase shifter not directly connected to a power supply. Passive phase shifters might introduce some insertion loss. The second amplifier 416 could boost the signal to compensate for the insertion loss. The phase shifter 414 could be an active phase shifter connected to a power supply such that the active phase shifter provides some amount of gain or prevents insertion loss. The settings of each of the phase shifters 414 are independent meaning that each can be set to provide a desired amount of phase shift or the same amount of phase shift or some other configuration. The modem 402 and/or the communications manager 434 may have at least one control line connected to each of the phase shifters 414 and which may be used to configure the phase shifters 414 to provide a desired amounts of phase shift or phase offset between antenna elements 420.

In the illustrated architecture 400, RF signals received by the antenna elements 420 are provided to one or more of first amplifier 456 to boost the signal strength. The first amplifier 456 may be connected to the same antenna arrays 418, e.g., for TDD operations. The first amplifier 456 may be connected to different antenna arrays 418. The boosted RF signal is input into one or more of phase shifter 454 to provide a configurable phase shift or phase offset for the corresponding received RF signal. The phase shifter 454 may be an active phase shifter or a passive phase shifter. The settings of the phase shifters 454 are independent, meaning that each can be set to provide a desired amount of phase shift or the same amount of phase shift or some other configuration. The modem 402 and/or the communications manager 434 may have at least one control line connected to each of the phase shifters 454 and which may be used to configure the phase sifters 454 to provide a desired amount of phase shift or phase offset between antenna elements 420.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signal input to combiner 450 have the same magnitude. The amplifiers 452 and/or 456 are illustrated in dashed lines because they might not be necessary in some implementations. In one implementation, both the amplifier 452 and the amplifier 456 are present. In another, neither the amplifier 452 nor the amplifier 456 are present. In other implementations, one of the amplifiers 452, 456 is present but not the other.

In the illustrated architecture 400, signals output by the phase shifters 454 (via the amplifiers 452 when present) are combined in combiner 450. The combiner 450 in architecture combines the RF signal into a signal, as denoted by its presence in box 428. The combiner 450 may be a passive combiner, e.g., not connected to a power source, which may result in some insertion loss. The combiner 450 may be an active combiner, e.g., connected to a power source, which may result in some signal gain. When combiner 450 is an active combiner, it may provide a different (e.g., configurable) amount of gain for each input signal so that the input signals have the same magnitude when they are combined. When combiner 450 is an active combiner, it may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to analog signals. The analog signals output from ADC 444 is input to modem 402 for baseband processing, e.g., decoding, de-interleaving, etc.

The architecture 400 is given by way of example only to illustrate an architecture for transmitting and/or receiving signals. It will be understood that the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although only a single antenna array 418 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 422, 424, 426, 428) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator (LO) phase shifting. In one implementation of this configuration, there may be a plurality of IF to RF mixers (e.g., for each antenna element chain) within the second mixer 408 and the local oscillator B 432 would supply different local oscillator signals (with different phase offsets) to each IF to RF mixer.

The modem 402 and/or the communications manager 434 may control one or more of the other components 404-472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the plurality of signals relative to each other.

The communications manager 434 may, identify a first set of one or more beams for communication with a first cell on a first carrier and identify a second set of one or more beams for communication with a second cell on a second carrier. The communications manager 434 may identify a group of beams the are allowed or disallowed by a current configuration of the UE. The communications manager 434 may transmit an indication of a group of beams to the first cell or the second cell, the indication of the group of beams indicating allowed or disallowed combinations of beams for concurrent transmission or reception at the UE on the first and second carriers. The communications manager 434 may be located partially or fully within one or more other components of the architecture 400. For example, the communications manager 434 may be located within the modem 402 in at least one implementation.

FIG. 5 is a diagram illustrating a UE 500 supporting beam grouping for inter-band carrier aggregation, according to one embodiment. The UE 500 may be an example of a UE of previous figures such as a UE 102 of FIG. 1, a UE 350 of FIG. 3, or a UE including an architecture 400 of FIG. 4. The UE 500 includes antenna modules including a first antenna module 305-A, a second antenna module 305-B, and a third antenna module 305-C. Each of the antenna modules 305-A, 305-B, and 305-C may include one or more subarrays of antennas (such as one or more of the antenna subarrays 420 of FIG. 4). The antenna modules 305-A, 305-B, and 305-C are shown oriented in different planar directions to provide modular spatial coverage for the UE 500. It should be noted that different directions, additional antenna modules in other directions or fewer antenna modules may be present in other contemplated embodiments. In one embodiment, each of the antenna modules 305-A, 305-B, and 305-C is equipped with antennas across different bands that share one or more RF chains. Example bands include 24 GHz, 26 GHz, 28 GHz, 39 GHz, 42 GHz, 60 GHz, 73 GHz, 95+GHz, and others.

According to one embodiment, each module is controlled by an RF integrated circuit (RFIC) and RF chains of the UE may be switched across different antenna modules 305-A, 305-B, and 305-C to provide for transmission and reception of wireless signal based on a desired beam direction for a base station or cell. Based on the number of available RF chains on the UE 500 and the number of RF chains that may be handled per antenna module, the UE 500 may have different options for supporting inter-band carrier aggregation. By way of example, a first example option and a second example option will be discussed in relation to an implementation where the UE 500 has four total RF chains.

The first example option is to support four RF chains or layers in the UE 500 with no limitations on the number of RF chains per antenna module. This first example option may be used to support four RF chains along a dominant cluster in the channel, such as 2 per polarization (e.g. horizontal and vertical polarizations) for different bands. For example, having no limitations on the inter-band carrier aggregation may allow the following layers to be transmitted/received by the UE 500 on the same antenna module at the same time: 28 GHz horizontally polarized, 28 GHz vertically polarized, 39 GHz horizontally polarized, and 39 GHz vertically polarized on the same antenna module. Allowing different carriers on the same module at the same time may, in at least some circumstances, allow for high rate performance because a best cluster (which may be common for both 28/39 GHz channels) can be used for both bands. However, using a large number of layers per antenna module may lead to higher power consumption and thermal overshoot. This may also lead to increased device design complexity, which may be desirable to avoid in at least some UE designs. Thus, having no limitations on the number of layers/chains per antenna module, as in the first example option, may not be desirable in some circumstances, such as when there are thermal challenges or low power requirements.

The second example option is to support four RF chains or layers in the UE 500, but with a limitation of two RF chains (or some other number) per antenna module. This second example option may be used to limit the number of RF chains and/or the number of carriers that are to be used at a time in an antenna module. It may provide support for two RF chains along a dominant cluster in the channel, such as two polarizations (e.g. horizontal and vertical polarizations) for the same band. For example, limits on inter-band carrier aggregation on the same antenna module may allow the following layers on the same antenna module to be transmitted/received by the UE 500: 28 GHz horizontally polarized and 28 GHz vertically polarized on the first antenna module 305-A; and 39 GHz horizontally polarized and 39 GHz vertically polarized on the second antenna module 305-B. The foregoing example may cause the different bands to be used in non-overlapping coverage areas, which may limit a device's ability to take advantage of a best cluster if it is common to both bands because at least one band/cell is forced to a second or other sub-optimal cluster. However, constraining different carriers to be used on different modules may result in lower power consumption and reductions in heat, which may be prioritized over data rates in some situations.

In at least one embodiment, the UE 500 may support dynamic switching between the first example option and the second example option (or other options). Support for switching between different per-antenna module limitations may allow for a UE 500 to take advantage of a common optimal cluster (e.g., using the first example option, discussed above) when battery level is high and/or device temperature is not a concern, such as for brief data bursts. When battery level or other power constraints or temperature constraints are encountered, the UE 500 would then have the option to switch to a different option, such as the second example option discussed above.

Because multiple different options are possible, it may be desirable to allow the UE to signal to a base station, UE, or other wireless communication device which of the limitations apply.

FIGS. 6A and 6B are diagrams illustrating a UE 500 that supports beam grouping for inter-band carrier aggregation and illustrating beams for different carriers/bands, according to one embodiment. FIG. 6A shows a first set of beams corresponding to a first carrier of a first cell served by a first transmit/receive point (TRP). The first set of beams includes Beam 1, Beam 2, Beam 3, and Beam 4. FIG. 6B shows a second set of beams corresponding to a second carrier of a second cell served by a second TRP. The second set of beams includes Beam A, Beam B, Beam C, and Beam D.

According to one example, the first cell may use a 28 GHz band and the second cell may use a 39 GHz band. The first cell and second cell may use respective first and second TRPs which may be part of the same or different base stations (such as a gNB). The first and second TRPs may be co-located or located at geographically different locations. Both the first cell and the second cell may train the UE 500 for beamforming via transmissions of synchronization signal blocks (SSBs), CSI-RS, or the like. The UE 500 may report the indices of beams that it detects. In our example, Beams 1-4 represent the top four beams (or four beams that match or exceed a first received signal power threshold) for the first cell and Beams A-D represent the top four beams (or four beams above a second received signal power threshold) for the second cell. Beams 1-4 and Beams A-D may be respectively ranked (such as in decreasing order of RSRP, SNR, signal-to-interference and noise ratio (SINR), reference signal received quality (RSRQ), reference signal strength indicator (RSSI), or the like). It should be noted that the Beams 1-4 and A-D may represent transmit beams, receive beams, or both transmit and receive beams.

In one embodiment, the first cell may configure the UE 500 with a plurality of transmission control indication (TCI) states with at least one TCI state corresponding to each of Beam 1, Beam 2, Beam 3, and Beam 4. Similarly, the second cell may configure the UE 500 with a plurality of TCI states with at least one TCI state corresponding to each of Beam A, Beam B, Beam C, and Beam D. Thus, the UE 500 or a corresponding cell (e.g., a base station corresponding to the first cell and/or second cell) may reference or select a beam by indicating a corresponding TCI state or a beam index that corresponds to the respective beam. A TCI state may be a state that defines one or more parameters for how the base station or UE is to transmit a communication. For example, the TCI state may be a previously configured state associated with a number or index and which corresponds to parameters such as beam information or other spatial or quasi-co-location information, power control, a modulation and coding scheme (MCS), a bandwidth part or carrier, or any other parameter indicating how the base station or UE is to transmit a transmission. For example, a base station may configure or indicate a TCI state for each downlink or uplink grant so that the UE 500 will know how to prepare to receive or transmit a corresponding transmission.

Note that, for the first cell, Beam 1 and Beam 4 correspond to the first antenna module 305-A, Beam 2 corresponds to the second antenna module 305-B, and Beam 3 corresponds to the third antenna module 305-C. Similarly for the second cell, note that Beam A and Beam D correspond to the first antenna module 305-A, Beam B corresponds to the second antenna module 305-B, and Beam C corresponds to the third antenna module 305-C. With the beams/TCI states corresponding to different modules, the UE 500 may have different combinations of beams that are or are not supported based on limitations at the UE 500. If only a single carrier may be scheduled per antenna module, for example, Beam 1 and Beam A may not be used at the same time. Because this may be dynamic and/or because a base station or cell may not know which module corresponds to which beam/TCI state, the UE 500 may identify allowed or disallowed beam combinations and send an indication of the allowed or disallowed beam combinations to the first cell and/or second cell.

According to one embodiment, the UE 500 may indicate, to the first cell and/or the second cell, beam groups that are allowed and/or the associated bands for which the corresponding beam is allowed. The associated band may be directly indicated (e.g., by indicating both a beam index and a band/carrier) or may be indirectly indicated or implied (e.g., by indicating the cell or TCI state or other information associated with the beam index and/or the band/carrier).

In one embodiment, the UE 500 may transmit information that indicates an allowed group of beams. The information may indicate a series of indices, a carrier corresponding to the indices, and/or other information associating beams into one or more allowed group of beams. The indication of the allowed group of beams may indicate beams that may be used for simultaneous half duplex or full duplex communications. Based on this information, one or more base stations corresponding to the first cell and second cell may schedule uplink or downlink communications and associated channel resources where one, more or all the beams in the group of beams are used in the same symbol, slot, subframe, or other time (or frequency) resource.

According to the first example option discussed in relation to FIG. 5, where the UE 500 supports four RF chains with a limitation of two RF chains per module and no inter-band carrier aggregation within an antenna module, the UE 500 may transmit an indication that the following groups of beams are allowed: a first group including Beam 1 and Beam 2; a second group including Beam A and B; a third group including Beam 1 and Beam B for inter-band carrier aggregation across different antenna modules; or a fourth group including Beam 2 and Beam A for inter-band carrier aggregation across different antenna modules. Note that the band (28 GHz or 39 GHz) may be implied based on the Beam being associated with a respective cell. In the above groups, each beam supports two RF chains (for the different polarizations) so that each of the indicated groups could use up to four RF chains. Also note that the "best" possible beams are used, according to the ranking (e.g., a second ranked beam such as Beam 2 or Beam B is only used if the first ranked beam, such as Beam 1 or Beam A is unavailable due to the limitations and third ranked beams may not be included in any of the groups of beams). The first cell and second cell may then select beams for communication such that only beam combinations within one of the indicated groups are scheduled for communications with/by the UE 500 at any given time.

As another example, if the UE 500 supports six total RF chains with a limitation of two RF chains per module and no inter-band carrier aggregation within an antenna module, the UE 500 may transmit an indication that the following groups of beams are allowed: a first group including Beam 1, Beam 2, and Beam 3; a second group including Beam A, Beam B, and Beam C; a third group including Beam 1, Beam B, and Beam 3 for inter-band; a fourth group including Beam 1, Beam B, and Beam C for inter-band; a fifth group including Beam A, Beam 2, and Beam 3 for inter-band; or a sixth group including Beam A, Beam 2, and Beam C for inter-band. In the above groups, each beam supports two RF chains (for the different polarizations) so that each of the indicated groups could use up to six RF chains. The first cell and second cell may then select beams for communication such that only beam combinations within one of the indicated groups are scheduled for communications with/by the UE 500 at any given time.

In one embodiment, the UE 500 may transmit information that indicates a disallowed group of beams. For example, if inter-band carrier aggregation is allowed between antenna modules the UE 500 and beam groups of size 2 are allowed, the UE 500 may transmit an indication that a group of beams including Beam 1 and Beam A is not allowed. Inter-band carrier aggregation on Beam 1 (28 GHz) and Beam A (39 GHz) may not be allowed because they are on the same antenna module (the first antenna module 305-A) and inter-band carrier aggregation on the same antenna module is not allowed by the UE 500 due to thermal or power or complexity reasons.

In one embodiment, a combination of allowed and disallowed beam groups may be indicated by the UE 500. For example, the UE 500 may conditionally allow or disallow certain combinations of beams. The conditions may include battery level at the UE 500, thermal conditions at the UE 500, at service level, data rate requirements or applications used, or other conditions. For example, the UE 500 may allow any combination of two or fewer beams for a total of up to four RF chains if both a battery level is above a first threshold and the thermal conditions or a measure of temperature are below a second threshold. If both these conditions are satisfied, the UE 500 may transmit an indication that a group of beams including Beam 1 and Beam A are allowed. If either of these conditions are not met, the UE 500 may transmit an indication that group of beams including Beam 1 and Beam A are not allowed. The UE 500 may transmit an updated indication of allowed or disallowed beams each time the conditions are or are not satisfied or a set of beams change.

Figure 7:
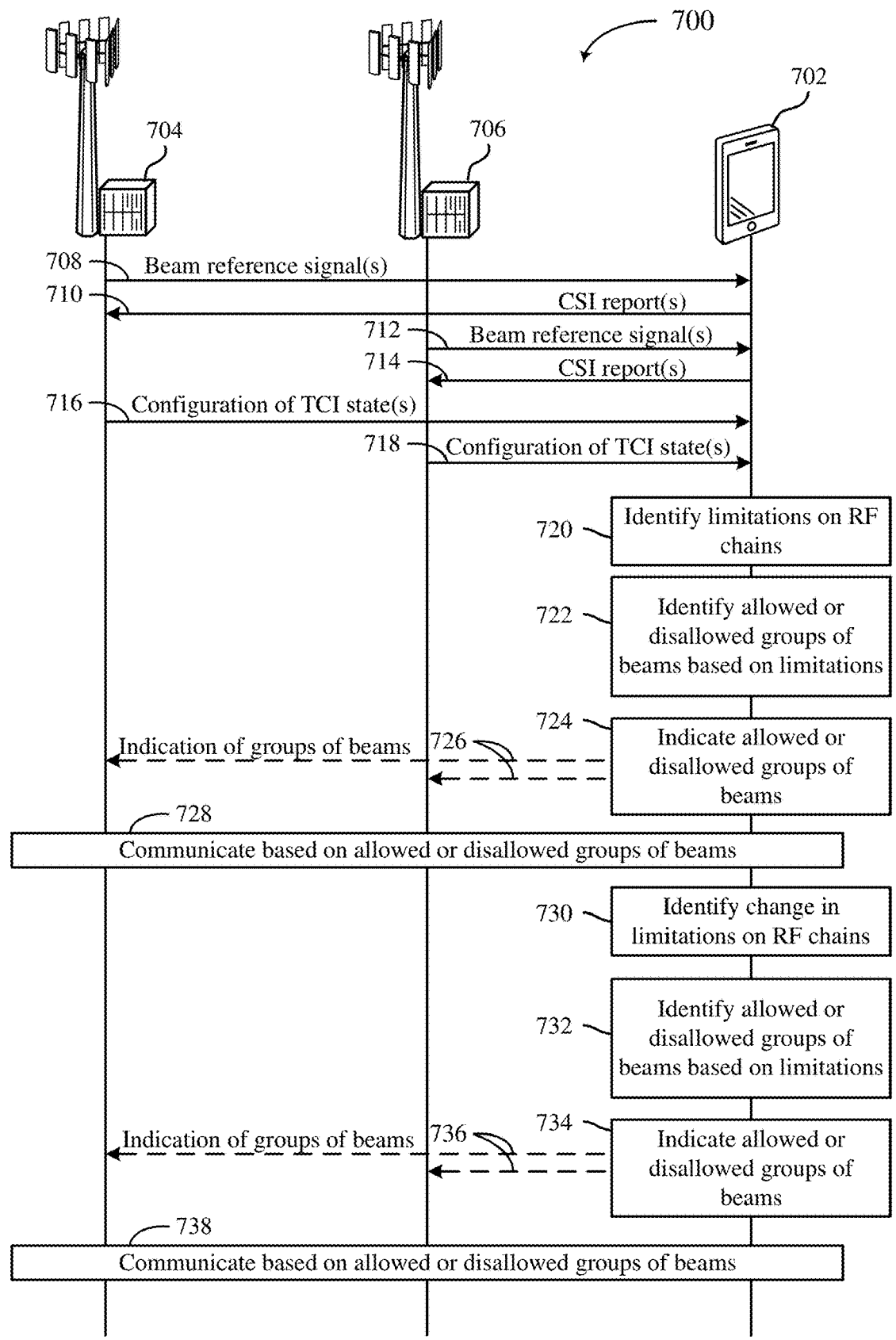
FIG. 7 is a schematic swim lane diagram illustrating a method for beam grouping for inter-band carrier aggregation in accordance with certain aspects of the disclosure.

FIG. 7 is a schematic swim lane diagram illustrating a method 700 for beam grouping for inter-band carrier aggregation, according to one implementation. The method 700 may involve communications between a UE 702 and one or more TRPs including a first TRP 704 and a second TRP 706. The first and second TRPs 704, 706 may be used for communications on different carriers or cells and may be part of a same or different base stations. The first cell may use the first TRP 704 to transmit or receive signals on a first carrier. The second cell may use the second TRP 706 to transmit or receive signals on a second carrier. The UE 702 may be an example of a UE 104 of FIG. 1, the UE 350 of FIG. 3, the UEs 500 of FIGS. 5, 6A, and 6B, or other wireless communication device discussed herein. The TRPs 704, 706 may be TRPs of a base station such as a base station 102 of FIG. 1 or the base station 310 of FIG. 3. Although FIG. 7 illustrates two TRPs operating in two or more carriers, it should be understood that three or more TRPS operating in three or more carriers are contemplated by the present disclosure.

At 708, a first cell using a first TRP 704 transmits, and the UE 702 receives, one or more beam reference signals. At 710, the UE 702 transmits, and the first cell receives via the first TRP 704, one or more CSI reports. At 712, a second cell using a second TRP 706 transmits, and the UE 702 receives, one or more beam reference signals. At 714, the UE 702 transmits, and the second cell receives via the second TRP 706, one or more CSI reports. The beam reference signals at 708 and 712 may include SSBs, CSI-RS, or other signals sent on one or more beams. The UE 702 may receive the beam reference signals and determine channel parameters for each beam to determine channel state information (CSI). The CSI may include RSRP or other information for each beam corresponding to the beam reference signals. The CSI reports may include CSI for one or more of the beams corresponding to the respective cells. The CSI reports may include a subset of the beams corresponding to the received beam reference signals. For example, the CSI reports may include CSI corresponding to a number of top beams or a number of beams that have channel parameters that meet a threshold requirement (e.g., RSRP above an RSRP threshold).

At 716, the first cell transmits on the first TRP 704, and the UE 702 receives, a configuration of one or more TCI states for the first cell. The TCI states may include transmission configurations corresponding to one or more beams indicated in the CSI reports at 710. At 718, the second cell transmits on the second TRP 706, and the UE 702 receives, a configuration of one or more TCI states for the second cell. The TCI states may include transmission configurations corresponding to one or more beams indicated in the CSI reports at 712. The UE 702 and the first cell (or a base station corresponding to the first cell) may identify a first set of beams for communication based on one or more of the beam reference signals at 708, the CSI reports at 710, and the configuration of TCI states at 716. For example, the first set of beams may include beams corresponding to the configured TCI states. Similarly, the UE 702 and the second cell (or a base station corresponding to the second cell) may identify a second set of beams for communication based on one or more of the beam reference signals at 712, the CSI reports at 714, and the configuration of TCI states at 716. For example, the second set of beams may include beams corresponding to the configured TCI states. In some embodiments, beam training may include signaling for beam reference signals and feeding back an indication of beams corresponding to the beam reference signals. For example, the transmitting, signaling, and processing associated with the beam reference signals at 712, the CSI reports at 714, and the TCI states at 716 (or at 708, 710, and 718) may be referred to as beam training or as performing beam training.

In one embodiment, a base station and the UE 702 may identify a first set of beams corresponding to the first cell in a first carrier based on beam training, such as by using the first TRP 704. The base station may identify the first set of beams based on beam training, based on CSI reports and/or based on configured TCI states. A same or different base station and the UE 702 may identify a second set of beams corresponding to the second cell in a second carrier based on beam training, such as by using the second TRP 706. The base station may identify the second set of beams based on beam training, based on CSI reports and/or based on configured TCI states.

At 720, the UE 702 identifies limitations on RF chains for the UE 702. The limitations may include limitations such as: limitations on the number of RF chains available on the UE 702; limitations on a number of RF chains that can be utilized at the same time at the UE 702; limitations on a number of RF chains that can utilized at the same time within a single antenna module of the UE 702; and/or limitations on inter-band carrier aggregation, such as a limitation to one, two or other number of carriers at the same time within a single antenna module of the UE 702. The limitations may be static or dynamic limitations. Static limitations may relate to hardware limitation or limitations that do not change on the UE 702. For example, a static limitation may include the number or RF chains available on the UE 702.

Dynamic limitations may include limitations which may change over time. An example of a dynamic limitation may be limitation on the number of RF chains that can be utilized at the same time within a single antenna module or a limitation on inter-band carrier aggregation within a single antenna module. Example conditions that may dynamically affect RF chain limitations include a thermal condition at the UE, a power condition at the UE, a maximum permissible exposure (MPE) condition at the UE, a number of clusters between the UE 702 and the first cell, a number of clusters between the UE and the second cell, and a quality of service requirement. A thermal condition may include allowing inter-band carrier aggregation or a higher number of RF chains on a single antenna module based on a device temperature or antenna module temperature falling below a threshold value. A power condition may include allowing inter-band carrier aggregation or a higher number of RF chains on a single antenna module based on a battery level exceeding a threshold. An MPE condition may result in an increase or decrease in a number of RF chains on a single antenna module based on the presence of an MPE condition. Example MPE conditions may be detection of an object in proximity of an antenna or module. A lower number of clusters between the UE 702 and the first cell or a second cell may allow for an increased number of RF chains on a single antenna module to allow a best cluster to be used. A quality of service requirement for traffic with the UE 702 may allow for inter-band carrier aggregation to be enabled or allow a higher or lower number of RF chains on a single antenna module. A higher QoS may allow for more RF chains per module while a lower QoS may allow for a reduced number of RF chains per module. The above conditions and resulting limitations on RF chains or inter-carrier aggregation are given by way of example only, and may not limit one or more contemplated implementations.

At 722, the UE 702 identifies allowed or disallowed groups of beams based on the limitations at the UE 702, such as the limitations identified at 720. In one embodiment, the UE 702 may eliminate all beam combinations (or possible groups of beams) that violate the limitations to produce one or more allowed groups of beams. In another embodiment, the UE 702 may select all beam combinations (or possible groups of beams) that violate the limitations to produce one or more disallowed groups of beams.

At 724, the UE 702 indicates allowed or disallowed groups of beams. The UE 702 may indicate the allowed or disallowed beams by transmitting, at 726, an indication of the group of beams or information indicating the groups of beams that are allowed or disallowed based on the identifying the group of beams at 722. The indication of the group of beams may indicate a plurality of groups of beams and at least one of the plurality of the groups of beams may include at least one beam corresponding to a first cell on a first carrier and at least one beam corresponding to a second beam on a second carrier. The groups of beams may indicate that beams within a same group are available for concurrent transmission or reception by the UE during a same transmission time interval. The same transmission time interval may include a slot, a half slot, or one or more consecutive symbols. The same transmission interval may include a time period beginning after transmission or reception of the indication of the group(s) of beams and ending upon transmission or reception of an updated indication of the group(s) of beams. Thus, according to one implementation, at any given point of time in the transmission time interval only allowed groups of beams may be used simultaneously and disallowed groups of beams may not be used.

In one embodiment, the indication of the group of beams at 726 may include an implied or explicit indication of the carrier for each of the beams. For example, the indication of the group of beams may indicate the carrier by indicating one or more of a corresponding cell, a TCI state associated with the corresponding cell, a beam index associated with the corresponding cell, and/or a frequency band or band identifier corresponding to the carrier. In one embodiment, the indication of the group of beams 726 may include an indication of a group of TCI states, where each TCI state is associated with a specific carrier or cell. For example, the UE 702 may transmit an identifier or other information that indicates a modulation and coding scheme, a transmission configuration, channel state information, and/or parameters related to an uplink or downlink grant. The UE 702 may transmit the indication of the group of beams or group of TCI states in uplink control information (UCI), in a medium access control-control element (MAC-CE), and/or in a radio resource control (RRC) message.

The UE 702 may indicate the allowed or disallowed groups of beams at 724 at least partially in response to identifying the allowed or disallowed beams at 722 or in response to identifying the limitations on the RF chains at 720. In one embodiment, each time a change in limitations occurs or is detected, the UE 702 may provide an updated indication of the allowed or disallowed groups of beams. Similarly, each time the sets of beams or TCI states change, an updated indication of the allowed or disallowed groups of beams may be provided.

At 728, the UE 702 and one or more cells including the first cell via the first TRP 704 and/or the second cell via the second TRP 706 communicate based on the allowed or disallowed groups of beams. For example, the UE 702 may receive, and the first TRP 704 and the second TRP 706 may be used to transmit, grants for uplink or downlink communications. The base station or base stations controlling the first TRP 704 and the second TRP 706 may coordinate to ensure that any grants for uplink or downlink communications comply with the allowed or disallowed groups of beams. For example, a base stations corresponding to the first TRP 704 may communicate with a base station corresponding to the second TRP 706 over an X2 interface or other interface to ensure that beams scheduled within the same time period for the UE 702 comply with the allowed groups of beams or disallowed groups of beams indicated by the UE 702.

In one embodiment, the UE 702 receives one or more configurations in a downlink control information that provides an uplink or downlink grant to the UE 702 in compliance with the allowed or disallowed groups of beams. For example, the UE 702 may receive configurations for a plurality of communications during a transmission time interval, wherein the configuration indicates beams for the plurality of communications. The beams for the plurality of communications may correspond to or be a subset of beams in at least one group of beams in a plurality of allowed groups of beams indicated by the UE to the corresponding cells or base stations. As another example, the UE 702 may receive configurations for a plurality of communications during a transmission time interval, where the beams for the plurality of communications may be a group of beams or combination of beams not found in a disallowed groups of beams indicated by the UE. When the grants comply with the indication of the groups of beams, the UE 702 may receive or transmit signals or messages as indicated in the grants.

At 730, the UE 702 identifies a change in the limitations on the RF chains. For example, the UE 702 may periodically check whether the limitations have changed by identifying current limitations on the RF chain based on current conditions, as at 720, and determine if the limitations have changed. If the limitations are different or the current conditions have changed enough to result in a change in limitations on the RF chain, the UE 702 may identify the changed limitations. As discussed previously, limitations such as number of beams per module, number of carriers per module, number of RF chains per module, or other limitations may change based on conditions such as a battery power level at the UE 702, a power constraint at the UE 702, an MPE constraint at the UE 702, a quality of service (QoS) for a respective communication (e.g., lower QoS may allow for reduced RF chains per module), a thermal condition at the UE 702, a number of clusters between a module of the UE 702 and a base station, and/or other conditions. In some cases, the changes in limitations may be detected or triggered based on a trigger condition. The trigger condition may be based on the detection of one of the above conditions falling below or exceeding a threshold. UE 702 may check for the trigger condition by periodically checking one or more of the above conditions and determining whether a change in the RF chains limitations will result. If the conditions change or the RF limitations change, this may be a trigger condition that causes the UE to transmit an indication of allowed or disallowed beam groups.

At 732, the UE 702 identifies allowed or disallowed groups of beams based on the limitations identified at 730. The UE 702 may identify the allowed or disallowed beams in the same manner or similar manner as discussed in relation to identifying allowed or disallowed groups of beams at 722. At 734, the UE 702 indicates the allowed or disallowed groups of beams to the first and second cell via respective first and second TRPs 704, 706. The UE 702 may indicate the allowed or disallowed groups of beams by transmitting, at 736, an indication of the groups of beams to one or more of the first and second TRPs 704, 706. At 738, the UE 702 and one or more cells including the first cell via the first TRP 704 and/or the second cell via the second TRP 706 communicate based on the allowed or disallowed groups of beams as dictated at 734. In one embodiment, identifying and communicating changes in allowed or disallowed groups of beams may occur periodically so that similar operations and processed discussed in relation to 720, 722, 724 and 726 may be repeated to maintain an updated set of allowed or disallowed beams. Similarly, beam training may be repeatedly performed to maintain current sets of beams for each carrier.

Based on the embodiments of the present disclosure, a UE may perform inter-band carrier aggregation across multiple bands from multiple base stations in mmW bands to indicate to these base stations allowed or disallowed groups of beams, along with the carrier/band information for simultaneous transmission/reception to the UE. The base stations (or TRPs) for the different carriers can be either collocated or at different geographical locations. Examples of inter-band carrier aggregation may include simultaneous transmission or reception over component carriers at disparate mmW frequencies such as 24 GHz, 28 GHz, 39 GHz, or other frequencies. The allowed or disallowed groups of beams may be indicated by indicating allowed or disallowed TCI state groups with implied or explicit carrier/band information. Whether specific groups of beams (or groups of TCI states) are allowed or disallowed may change dynamically based on a thermal level, power level, or other conditions at the UE 702 or on a channel between the UE 702 and one or more base stations.

Figure 8:
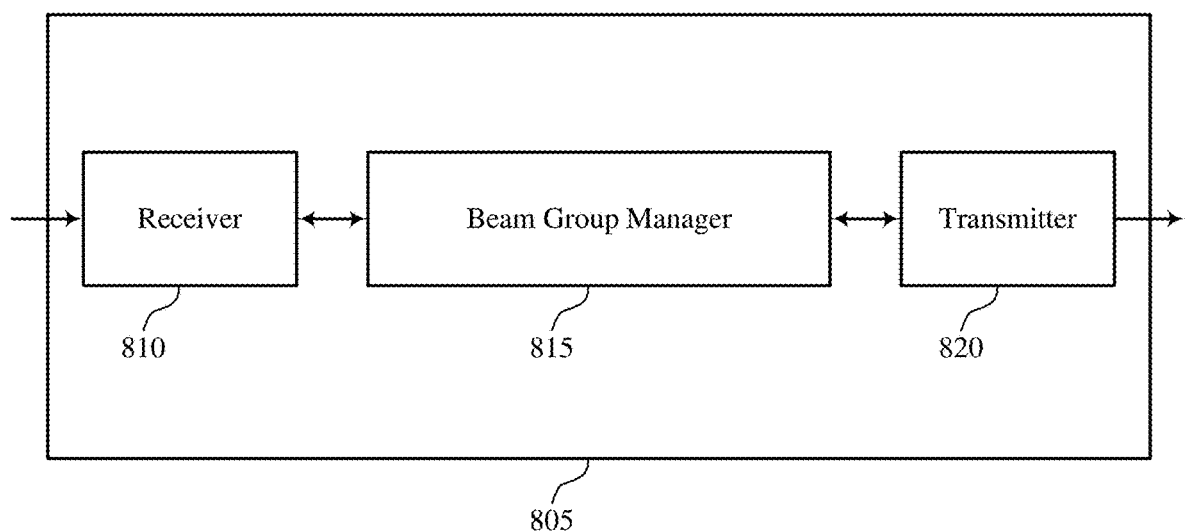
FIG. 8 is a diagram illustrating a device that supports beam grouping for inter-band carrier aggregation in accordance with aspects of the present disclosure.

FIG. 8 shows a block diagram 800 of a device 805 supporting beam grouping for inter-band carrier aggregation in accordance with aspects of the present disclosure. The device 805 may be an example of aspects of a UE 104/350/400/500/702 or any other wireless communication device described or discussed herein. The device 805 may include a receiver 810, a beam group manager 815, and a transmitter 820. The device 805 may also include a processor. Each of these components may be in communication with one another (e.g., via one or more buses).

The receiver 810 may receive information such as packets, user data, reference signals, or control information associated with various information channels (e.g., control channels, data channels, or other channels). The information may be received on one or more links or one or more beams. Information may be passed on to other components of the device 805. The receiver 810 may utilize a single antenna or a set of antennas.

The beam group manager 815 performs functions to identify sets of beams for one or more cells and indicate allowed or disallowed groups of beams. The beam group manager 815 may perform any of the functions, processes, or methods discussed in FIGS. 5, 6, and 7. For example, the beam group manager 815 may perform the functions of the UE 104 of FIG. 1, the communications manager 434 of FIG. 4, the UE 500 of FIGS. 5, 6A and 6B, or the UE 702 of FIG. 7 such as those at 190, 708, 710, 712, 714, 716, 716, 718, 720, 722, 724, 726, 728, 730, 732, 734, 736, 738, 524, or any combination thereof.

The beam group manager 815, or its sub-components, may be implemented in hardware, code (e.g., software or firmware) executed by a processor, or any combination thereof. If implemented in code executed by a processor, the functions of the beam group manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The beam group manager 815, or its sub-components, may be physically located at various positions, including being distributed such that portions of functions are implemented at different physical locations by one or more physical components. In some examples, the beam group manager 815, or its sub-components, may be a separate and distinct component in accordance with various aspects of the present disclosure. In some examples, the beam group manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. For example, the transmitter 802 may transmit reference signals, data messages, or control messages. In some examples, the transmitter 820 may be collocated with a receiver 810 in a transceiver module. For example, the transmitter 820 may be an example of aspects of the transmitter/receiver 354 of FIG. 3. The transmitter 820 may utilize a single antenna or a set of antennas.

Figure 9:
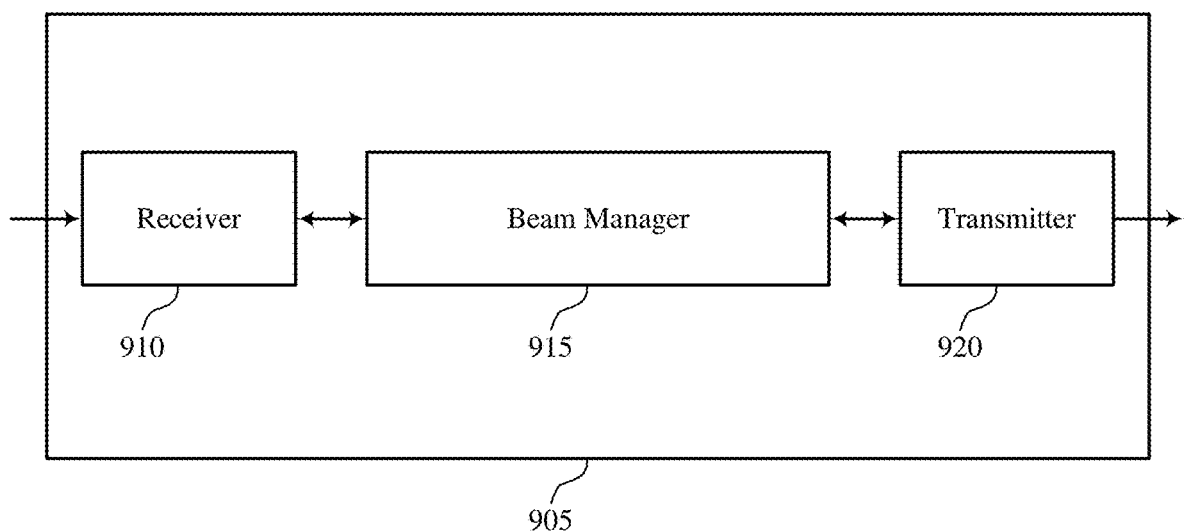
FIG. 9 is a diagram illustrating a device that supports beam grouping for inter-band carrier aggregation in accordance with aspects of the present disclosure.

FIG. 9 shows a block diagram 900 of a device 905 supporting beam grouping for inter-band carrier aggregation in accordance with aspects of the present disclosure. The device 905 may be an example of aspects of a base station 102/310 or any other wireless communication device described or discussed herein. The device 905 may include a receiver 910, a beam manager 915, and a transmitter 920. The device 905 may also include a processor. Each of these components may be in communication with one another (e.g., via one or more buses).

The receiver 910 may receive information such as packets, user data, reference signals, or control information associated with various information channels (e.g., control channels, data channels, or other channels). The information may be received on one or more links or one or more beams. Information may be passed on to other components of the device 905. The receiver 910 may utilize a single antenna or a set of antennas.

The beam manager 915 performs functions to identify a set of beams for communication with a UE, to receive an indication of allowed or disallowed beam groups from the UE, and to communicate with the UE based on the allowed or disallowed groups of beams. The beam manager 915 may cause the device to coordinate with another base station to comply with the indication of allowed or disallowed groups of beams. The beam manager 915 may perform any of the functions, processes, or methods discussed in FIG. 7. For example, the beam manager 915 may perform the functions of the base station, cell or TRPs 704, 706 such as those at 708, 710, 712, 714, 716, 716, 718, 726, 728, 730, 732, 736, 738, 524, or any combination thereof.

The beam manager 915, or its sub-components, may be implemented in hardware, code (e.g., software or firmware) executed by a processor, or any combination thereof. If implemented in code executed by a processor, the functions of the beam manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The beam manager 915, or its sub-components, may be physically located at various positions, including being distributed such that portions of functions are implemented at different physical locations by one or more physical components. In some examples, the beam manager 915, or its sub-components, may be a separate and distinct component in accordance with various aspects of the present disclosure. In some examples, the beam manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. For example, the transmitter 902 may transmit reference signals, data messages, or control messages. In some examples, the transmitter 920 may be collocated with a receiver 910 in a transceiver module. For example, the transmitter 920 may be an example of aspects of the transmitter/receiver 318 of FIG. 3 or the first TRP 704 or second TRP 706 of FIG. 7. The transmitter 920 may utilize a single antenna or a set of antennas.

Figure 10:
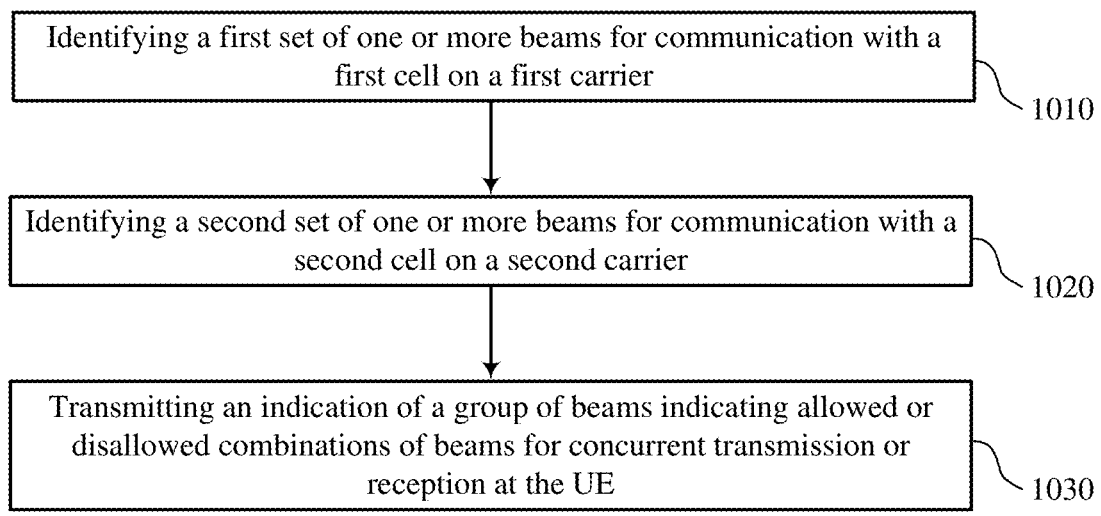
FIG. 10 is a flowchart of a method for beam grouping, in accordance with certain aspects of the disclosure.

FIG. 10 is a flowchart of a method 1000 for beam grouping, in accordance with certain aspects of the disclosure. This method 1000 may be performed by any wireless communication device described or discussed herein, such as a UE 104/350/400/500/702 or other wireless device (such as device 805).

In the method 1000, the device identifies 1010 a first set of one or more beams for communication with a first cell on a first carrier. The identifying 1010 may include any one or more of the aspects discussed in relation to 708, 710, and 716 in FIG. 7. The device identifies 1020 a second set of one or more beams for communication with a second cell on a second carrier. The identifying 1020 may include any one or more of the aspects discussed in relation to 712, 714, and 718 in FIG. 7. The device transmits 1030 an indication of a group of beams indicating allowed or disallowed combinations of beams for concurrent transmission or reception at the device. The transmitting 1030 may include any one or more of the aspects discussed in relation to 720, 722, 724, 726, 730, 732, 734, and/or 736 in FIG. 7. The device and another device may communicate based on the allowed or disallowed groups of beams.

Figure 11:
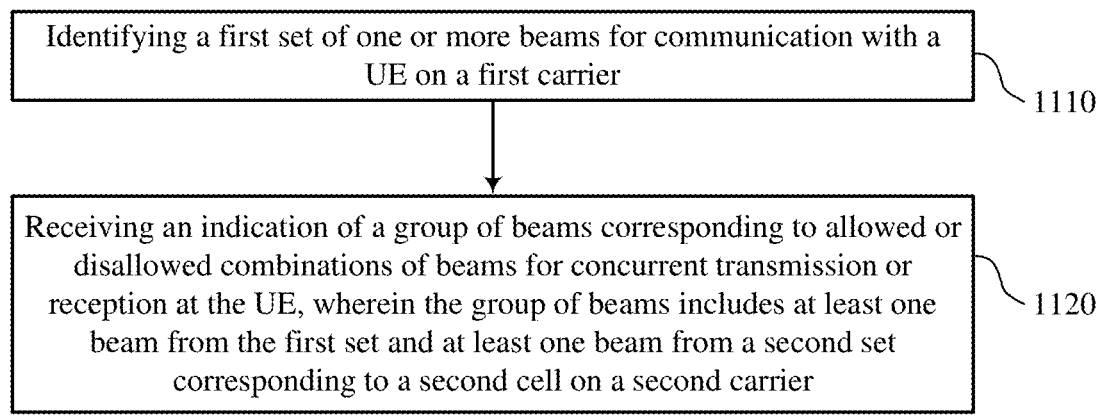
FIG. 11 is a flowchart of a method for beam grouping, in accordance with certain aspects of the disclosure.

FIG. 11 is a flowchart of a method 1100 for beam grouping, in accordance with certain aspects of the disclosure. This method 1100 may be performed by any wireless communication device described or discussed herein, such as a base station 102/310 or a base station associated with TRP 704 706 or other wireless device (such as device 905).

In the method 1100, the device identifies 1110 a first set of one or more beams for communication with a UE on a first carrier. The identifying 1110 may include any one or more of the aspects discussed in relation to 708, 710, 712, 714, 716, and 718 in FIG. 7. The device receives 1120 an indication of a group of beams corresponding to allowed or disallowed combinations of beams for concurrent transmission or reception at the UE. The group of beams may include at least one beam from the first set and at least one beam from a second set corresponding to a second cell on a second carrier. The receiving 1120 may include any one or more of the aspects discussed in relation to 726 and 736 in FIG. 7. The device and another device may communicate based on the allowed or disallowed groups of beams.

The following aspects are given by way of example and may be combined with aspects, examples, or embodiments disclosed elsewhere herein without limitation.

A first aspect is a method for wireless communication at a UE. The UE identifies a first set of one or more beams for communication with a first cell on a first carrier. The UE identifies a second set of one or more beams for communication with a second cell on a second carrier. The UE transmits an indication of a group of beams to the first cell or the second cell, the indication of the group of beams indicating allowed or disallowed combinations of beams for concurrent transmission or reception at the UE on the first and second carriers.

In a second aspect, the group of beams in the first aspect includes at least one beam from the first set and at least one beam from the second set. In a third aspect, the concurrent transmission or reception in any of the first through second aspects includes transmission or reception by the UE during a same transmission time interval. In a fourth aspect, the same transmission time interval in the third aspect includes one or more of a slot, a half slot, or one or more consecutive symbols. In a fifth aspect, the indication of the group of beams in any of the first through fourth aspects further indicates a carrier for each of the beams in the group of beams. In a sixth aspect, the indication of the group of beams in the fifth aspect indicates the carrier by indicating one or more of: a corresponding cell; a transmission configuration indication (TCI) state associated with the corresponding cell; a beam index associated with the corresponding cell; or a frequency band or band identifier corresponding to the carrier.

In a seventh aspect, the method as in any of the first through sixth aspects further includes determining the allowed or disallowed combination of beams. In an eighth aspect, the transmitting the indication of the group of beams in the seventh aspect includes transmitting at least partially in response to determining the allowed or disallowed combination of beams. In a ninth aspect, determining the allowed or disallowed combination of beams in any of the seventh through eighth aspects includes determining based on: a number of radio frequency (RF) chains per antenna module at the UE; a thermal condition at the UE; a power condition at the UE; a maximum permissible exposure (MPE) condition at the UE; a number of clusters between the UE and the first cell; a number of clusters between the UE and the second cell; a quality of service requirement; or a combination thereof. In a tenth aspect, transmitting the indication of the group of beams in the ninth aspect includes transmitting in response to a trigger condition based at least in part on one or more of the thermal condition at the UE, the power condition at the UE, the MPE condition at the UE, the number of clusters between the UE and the first cell, the number of clusters between the UE and the second cell, or the quality of service requirement.

In an eleventh aspect, the indication of the group of beams further indicates, for each of the beams in the group of beams, one or more of: a modulation and coding scheme; a transmission configuration; or channel state information. In a twelfth aspect, transmitting the indication of the group of beams in any of the first through eleventh aspects includes transmitting an indication of a group of TCI states. In a thirteenth aspect, identifying the first set of one or more beams in any of the first through twelfth aspects includes identifying a first set of one or more TCI states and wherein identifying the second set of one or more beams comprises identifying a second set of one or more TCI states. In a fourteenth aspect, identifying the first set of one or more TCI states and identifying the second set of one or more TCI states in the thirteenth aspect includes receiving one or more messages configuring the first set of one or more TCI states for the first cell and the second set of one or more TCI states for the second cell.

In a fifteenth aspect, the indication of the group of beams in any of the first through fourteenth aspects includes an indication of allowed combinations of beams, and the corresponding methods further include receiving one or more configurations for a plurality of communications during a transmission time interval, wherein the configuration indicates beams for the plurality of communications, wherein the beams for the plurality of communications during the transmission time interval correspond to the beams in the group of beams. In a sixteenth aspect, the method of the fifteenth aspect further includes transmitting or receiving the plurality of communications during the transmission interval based on the configurations. In a seventeenth aspect, the one or more configurations in any of the fifteenth through sixteenth aspects includes one or more grants for a transmission or reception.

In an eighteenth aspect, the indication of the group of beams in any of the fifteenth through sixteenth aspects includes an indication of disallowed combinations of beams, the corresponding methods further comprising receiving one or more configuration for a plurality of communications during a transmission interval, wherein the configuration indicates beams for the plurality of communications, wherein the beams for the plurality of communications during the transmission time interval comprise a combination of beams not in the indication of the group of beams. In a nineteenth aspect, a method of the eighteenth aspect further includes transmitting or receiving the plurality of communications during the transmission interval based on the configurations. In a twentieth aspect, the one or more configurations in any of the eighteenth through twentieth aspects include one or more grants for a transmission or reception.

In a twenty-first aspect, the group of beams in any of the first through twentieth aspects includes a first group of beams, wherein transmitting the indication of the first group of beams comprises transmitting an indication of a set of beam groups, the set of the beam groups comprising at least the first group of beams and a second group of beams. In a twenty-second aspect, identifying the first set of one or more beams in any of the first through twenty-first aspects includes one or more of: receiving, from the first cell, one or more reference signals corresponding to the one or more beams of the first set; transmitting channel state information corresponding to the one or more reference signals to the first cell; or receiving a configuration for one or more TCI states from the first cell, the one or more TCI states corresponding to one or more of the one or more beams of the first set. In a twenty-third aspect, identifying the second set of one or more beams in any of the first through twenty-second aspects includes one or more of: receiving, from the second cell, one or more reference signals corresponding to the one or more beams of the second set; transmitting channel state information corresponding to the one or more reference signals to the second cell; or receiving a configuration for one or more TCI states from the second cell, the one or more TCI states corresponding to one or more of the one or more beams of the second set.

In a twenty-fourth aspect, transmitting the indication of the group of beams in any of the first through twenty-third aspects includes transmitting the indication of the group of beams in uplink control information. In a twenty-fifth aspect, transmitting the indication of the group of beams transmitting the indication of the group of beams in a MAC-CE. In a twenty-sixth aspect, transmitting the indication of the group of beams in any of the first through twenty-fifth aspects includes transmitting in a RRC message.

A twenty-seventh aspect is a method for wireless communication at a base station comprising. The base station identifies a first set of one or more beams for communication with a UE on a first carrier. The base station receives an indication of a group of beams corresponding to allowed or disallowed combinations of beams for concurrent transmission or reception at the UE. The group of beams includes at least one beam from the first set and at least one beam from a second set of one or more beams for communication between the UE and a second cell on a second carrier. In a twenty-eighth aspect, the concurrent transmission or reception in the twenty-seventh aspect includes transmission or reception by the UE during a same transmission time interval. In a twenty-ninth aspect, the same transmission time interval of the twenty-eighth aspect includes one or more of a slot, a half slot, one or more consecutive symbols.

In a thirtieth aspect, the indication of the group of beams in any of the twenty-seventh through twenty-ninth aspects further indicates a carrier for each of the beams in the group of beams. In a thirty-first aspect, the indication of the group of beams in the thirtieth aspect indicates the carrier by indicating one or more of: a corresponding cell; a transmission configuration indication (TCI) state associated with the corresponding cell; a beam index associated with the corresponding cell; or a frequency band or band identifier corresponding to the carrier. In a thirty-second aspect, the indication of the group of beams in any of the twenty-seventh through thirty-first aspects further indicates, for each of the beams in the group of beams, one or more of: a modulation and coding scheme; a transmission configuration; or channel state information.

In a thirty-third aspect, receiving the indication of the group of beams in any of the twenty-seventh through thirty-first aspects includes receiving an indication of a group of TCI states. In a thirty-fourth aspect, the method in any of the twenty-seventh through thirty-third aspects further includes transmitting to the UE a configuration for a plurality of TCI states for the first cell, wherein the group of TCI states comprises at least one TCI state from the plurality of TCI states for the first cell. In a thirty-fifth aspect, the method in any of the twenty-seventh through thirty-fourth aspects further includes coordinating with the second cell to comply with the allowed or disallowed combination of beams. In a thirty-sixth aspect, the indication of the group of beams in the thirty-fifth aspect includes an indication of allowed combinations of beams, the method further comprising: transmitting a grant for a communication with the UE during a transmission time interval, wherein the grant indicates a first beam for the communication, and wherein a grant for a communication between the UE and the second cell during the transmission time interval is on a second beam, wherein the group of beams includes the first beam and the second beam. In a thirty-seventh aspect, the indication of the group of beams in any of the thirty-fifth through thirty-sixth aspects further includes comprises an indication of disallowed combinations of beams, the method further includes transmitting a grant for a communication with the UE during a transmission time interval, wherein the grant indicates a third beam for the communication, and wherein a grant for communication between the UE and the second cell during the transmission time interval is on a fourth beam, wherein the group of beams does not include both the third beam and the fourth beam. In a thirty-eighth aspect, the method of the thirty-seventh aspect further includes transmitting or receiving communications during the transmission interval based on the complying with the allowed or disallowed combination of beams.

In a thirty-ninth aspect, the group of beams in any of the twenty-seventh through thirty-eighth aspects includes a first group of beams, wherein receiving the indication of the first group of beams comprises receiving an indication of a set of beam groups, the set of the beam groups comprising at least the first group of beams and a second group of beams. In a fortieth aspect, identifying the first set of one or more beams in any of the twenty-seventh through thirty-ninth aspects includes one or more of: transmitting, from the first cell, one or more reference signals corresponding to the one or more beams of the first set; receiving channel state information corresponding to the one or more reference signals from the UE; or transmitting a configuration for one or more TCI states from the first cell, the one or more TCI states corresponding to one or more of the one or more beams of the first set.

In a forty-first aspect, receiving the indication of the group of beams in any of the twenty-seventh through fortieth aspects includes receiving in uplink control information. In a forty-second aspect, receiving the indication of the group of beams in any of the twenty-seventh through forty-first aspects includes receiving in a MAC-CE. In a forty-third aspect, receiving the indication of the group of beams in any of the twenty-seventh through forty-second aspects includes receiving in a RRC message. In a forty-fourth aspect, receiving the indication of the group of beams in any of the twenty-seventh through forty-third aspects includes receiving from the UE. In a forty-fifth aspect, receiving the indication of the group of beams in any of the twenty-seventh through forty-fourth aspects includes receiving from a base station corresponding to the second cell.

In a forty-sixth aspect, an apparatus includes one or more processors and memory storing instructions which cause the apparatus to perform a method corresponding to any of the first through forty-fifth aspects. In a forty-seventh aspect, a non-transitory computer readable memory stores instructions which, when executed by one or more processors, cause the processors to realize a method or realize an apparatus of any of the first through forty-sixth aspects. In a forty-eighth aspect, an apparatus includes means for implementing a method or realizing an apparatus of any of the first through forty-eighth aspects.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication at a user equipment (UE) comprising:
   identifying a first set of one or more beams for communication with a first cell on a first carrier;
   identifying a second set of one or more beams for communication with a second cell on a second carrier; and
   transmitting an indication of a group of beams to the first cell or the second cell, the indication of the group of beams indicating allowed or disallowed combinations of beams for concurrent transmission or reception at the UE on the first and second carriers, wherein transmitting the indication of the group of beams comprises transmitting in response to a change in limitations on one or more radio frequency (RF) chains of the UE.

2. The method of claim 1, wherein the group of beams comprises at least one beam from the first set and at least one beam from the second set.

3. The method of claim 1, wherein the concurrent transmission or reception comprises transmission or reception by the UE during a same transmission time interval.

4. The method of claim 3, wherein the same transmission time interval comprises one or more of a slot, a half slot, or one or more consecutive symbols.

5. The method of claim 1, wherein the indication of the group of beams further indicates a carrier for each of the beams in the group of beams.

6. The method of claim 5, wherein the indication of the group of beams indicates the carrier by indicating a frequency band or band identifier corresponding to the carrier.

7. The method of claim 1, further comprising determining the allowed or disallowed combination of beams.

8. The method of claim 7, wherein transmitting the indication of the group of beams comprises transmitting at least partially in response to determining the allowed or disallowed combination of beams.

9. The method of claim 7, wherein determining the allowed or disallowed combination of beams comprises determining based on:
   a number of radio frequency (RF) chains per antenna module at the UE;
   a thermal condition at the UE;
   a power condition at the UE;
   a maximum permissible exposure (MPE) condition at the UE;
   a number of clusters between the UE and the first cell;
   a number of clusters between the UE and the second cell;
   a quality of service requirement; or
   a combination thereof.

10. The method of claim 1, wherein the change in limitations on the radio frequency chains comprises a change in limitations based at least in part on one or more of a thermal condition at the UE, a power condition at the UE, a maximum permissible exposure (MPE) condition at the UE, or a quality of service requirement.

11. The method of claim 1, wherein the indication of the group of beams further indicates, for each of the beams in the group of beams, one or more of:
   a modulation and coding scheme;
   a transmission configuration; or
   channel state information.

12. The method of claim 1, wherein transmitting the indication of the group of beams comprises transmitting an indication of a group of transmission configuration indication (TCI) states.

13. The method of claim 1, further comprising identifying the change in the limitations on the radio frequency chains of the UE, wherein identifying the change comprises, at least in part, identifying a change in:
   a number of beams per antenna module;
   a number of frequency carriers per antenna module; or
   a number of radio frequency chains per antenna module.

14. An user equipment (UE) comprising:
   one or more processors;
   memory in electronic communication with the one or more processors, the memory storing instructions which, when executed by the one or more processors, cause the UE to:
      identify a first set of one or more beams for communication with a first cell on a first carrier;
      identify a second set of one or more beams for communication with a second cell on a second carrier; and
      transmit an indication of a group of beams to the first cell or the second cell, the indication of the group of beams indicating allowed or disallowed combinations of beams for concurrent transmission or reception at the UE on the first and second carriers, wherein transmitting the indication of the group of beams comprises transmitting in response to a change in limitations on one or more radio frequency (RF) chains of the UE.

15. The UE of claim 14, wherein the group of beams comprises at least one beam from the first set and at least one beam from the second set.

16. The UE of claim 14, wherein the concurrent transmission or reception comprises transmission or reception by the UE during a same transmission time interval.

17. The UE of claim 16, wherein the same transmission time interval comprises one or more of a slot, a half slot, or one or more consecutive symbols.

18. The UE of claim 14, wherein the indication of the group of beams further indicates a carrier for each of the beams in the group of beams.

19. The UE of claim 18, wherein the indication of the group of beams indicates the carrier by indicating a frequency band or band identifier corresponding to the carrier.

20. The UE of claim 14, the memory further storing instructions which cause the UE to determine the allowed or disallowed combination of beams.

21. The UE of claim 20, wherein transmitting the indication of the group of beams comprises transmitting at least partially in response to determining the allowed or disallowed combination of beams.

22. The UE of claim 20 wherein the instructions cause the UE to determine the allowed or disallowed combination of beams by determining based on:
 a number of radio frequency (RF) chains per antenna module at the UE;
 a thermal condition at the UE;
 a power condition at the UE;
 a maximum permissible exposure (MPE) condition at the UE;
 a number of clusters between the UE and the first cell;
 a number of clusters between the UE and the second cell;
 a quality of service requirement; or
 a combination thereof.

23. The UE of claim 14, wherein transmitting the indication of the group of beams comprises transmitting an indication of a group of transmission configuration indication (TCI) states.

24. The UE of claim 14, the memory further storing instructions which cause the UE to identify the change based at least in part on identifying a change in:
 a number of beams per antenna module;
 a number of frequency carriers per antenna module; or
 a number of radio frequency chains per antenna module.

25. The UE of claim 14, wherein the change in limitations on the radio frequency chains comprises a change in limitations based at least in part on one or more of a thermal condition at the UE, a power condition at the UE, a maximum permissible exposure (MPE) condition at the UE, or a quality of service requirement.

26. The UE of claim 14, wherein the indication of the group of beams further indicates, for each of the beams in the group of beams, one or more of:
 a modulation and coding scheme;
 a transmission configuration; or
 channel state information.

27. An user equipment (UE) comprising:
 means for identifying a first set of one or more beams for communication with a first cell on a first carrier;
 means for identifying a second set of one or more beams for communication with a second cell on a second carrier; and
 means for transmitting an indication of a group of beams to the first cell or the second cell, the indication of the group of beams indicating allowed or disallowed combinations of beams for concurrent transmission or reception at the UE on the first and second carriers, wherein transmitting the indication of the group of beams comprises transmitting in response to a change in limitations on one or more radio frequency (RF) chains of the UE.

28. The UE of claim 27, wherein the group of beams comprises at least one beam from the first set and at least one beam from the second set.

29. The UE of claim 27, the UE further comprising means for identifying the change in limitations on the one or more RF chains based at least in part on identifying a change in:
 a number of beams per antenna module;
 a number of frequency carriers per antenna module; or
 a number of radio frequency chains per antenna module.

30. The UE of claim 27, wherein the change in limitations on the radio frequency chains comprises a change in limitations based at least in part on one or more of a thermal condition at the UE, a power condition at the UE, a maximum permissible exposure (MPE) condition at the UE, or a quality of service requirement.

* * * * *